Aug. 8, 1950  P. DE ANGUERA  2,518,293
HEAVY DUTY VEHICLE
Filed March 18, 1948  2 Sheets-Sheet 2
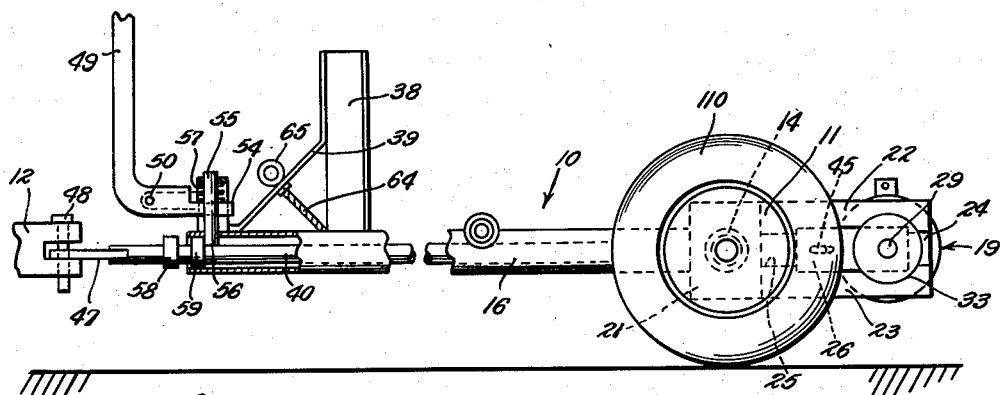
Fig. 3
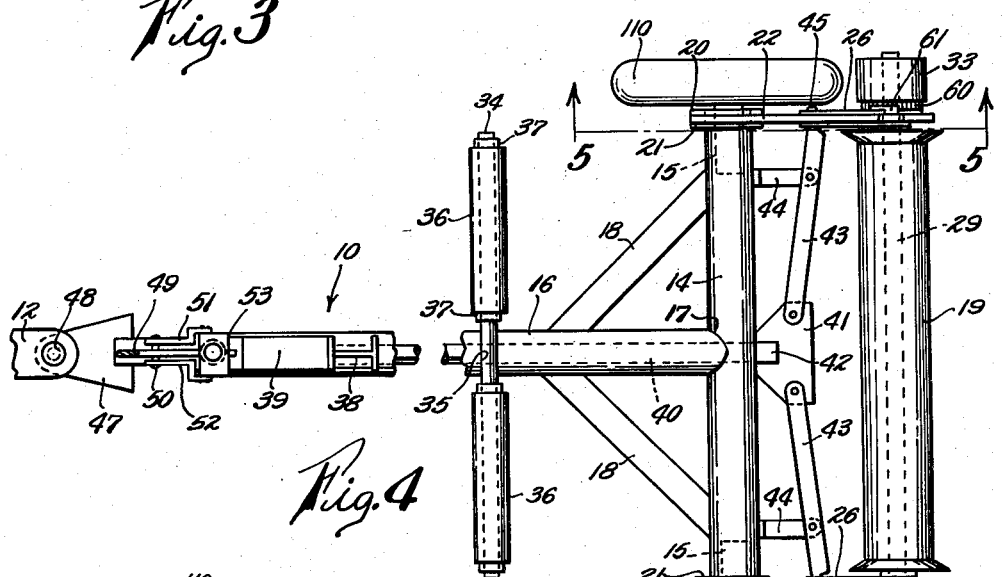
Fig. 4
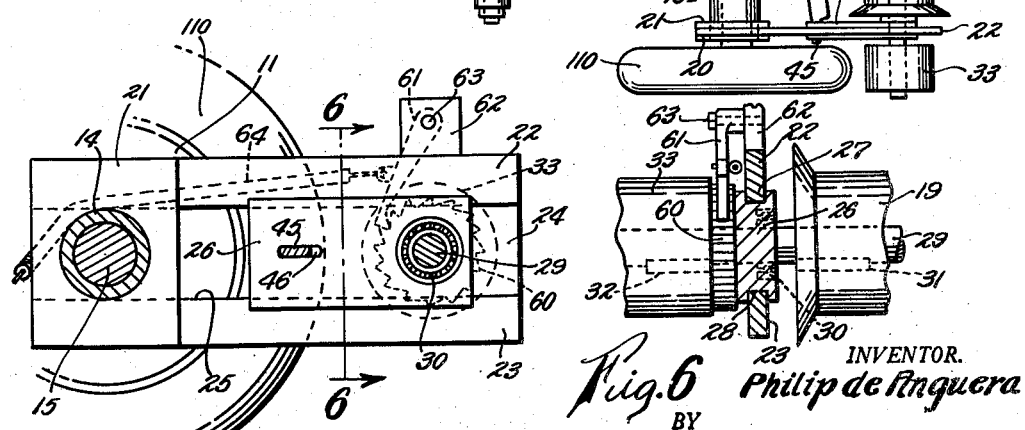
Fig. 5   Fig. 6
INVENTOR.
Philip de Anguera
BY
ATT'YS Patented Aug. 8, 1950

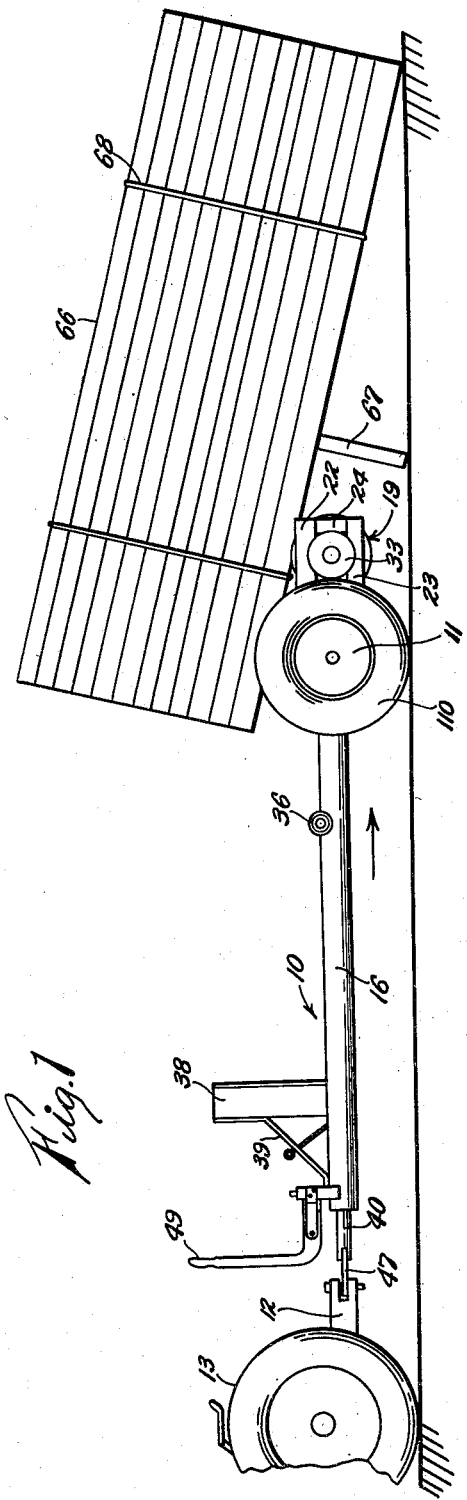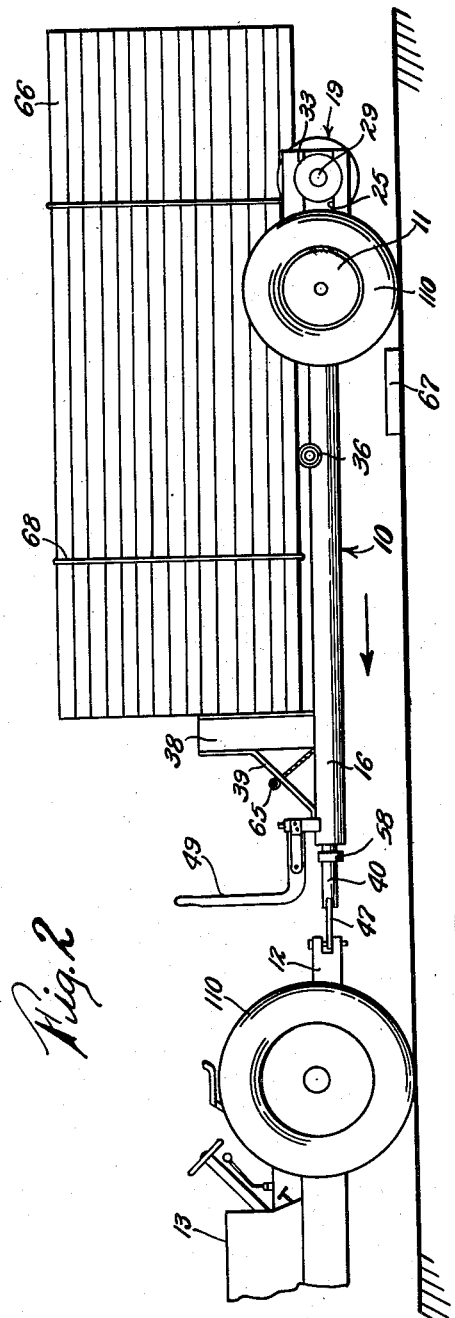

2,518,293

UNITED STATES PATENT OFFICE 2,518,293

HEAVY-DUTY VEHICLE

Philip de Anguera, Cincinnati, Ohio, assignor to Eva de Anguera, Hamilton, Ohio

Application March 18, 1948, Serial No. 15,563

10 Claims. (Cl. 214—84)

The present invention relates to heavy duty land transports and is specifically directed to an automatic loading and unloading mechanism for wheeled vehicles, to provide for the efficient pickup and delivery of freight such as sawed lumber, metal structural members, and the like.

An object of the invention is to provide in a self-loading and unloading vehicle a load transfer roller which is driven by the vehicle wheels.

Another object of the invention is to provide in an automatic loading and unloading vehicle a simplified and positive frictional drive connection between a load transfer roller therefor and the vehicle wheel.

A further object of the invention is to provide in a vehicle for carrying freight having the foregoing characteristics a drive connection between the freight transfer roller and the pneumatic tires of the vehicle wheels which utilizes the inertia of the transferred freight to force the drive mechanism for the roller into positive operative contact with the wheels.

A still further object of the invention is to provide in a loading and unloading freight carrying vehicle a trailer and prime mover articulated in a novel manner as to cooperate before the loading and the unloading operation to condition and set a positive drive connection between a load transfer roller mounted on the trailer and the pneumatic tires on the trailer wheels.

Other objects will become apparent from the following specification and drawings which clearly illustrate a preferred form of my invention, it being understood that I am not limited to the exact structure shown except in so far as is set forth in the appended claims.

In the drawings wherein like reference numerals indicate similar parts:

Fig. 1 is a side elevational view of my heavy duty vehicle illustrated in loading position, parts of the prime mover being broken away.

Fig. 2 is a side elevation of the heavy duty vehicle shown in loaded condition, parts of the prime mover again being broken away.

Fig. 3 is a fragmental side elevational view of the trailer for my vehicle, parts thereof being broken away and other parts being shown in cross section.

Fig. 4 is a top plan view of the device as it is illustrated in Fig. 3.

Fig. 5 is an enlarged section taken on line 5—5 of Fig. 4.

Fig. 6 is a section taken on line 6—6 of Fig. 5.

The embodiment of my invention is illustrated in connection with a trailer frame 10 having at least a pair of rear wheels 11 and preferably supported at its front end by a draft connection with a bar 12 extending rearwardly from a prime mover 13 such as a tractor, or the like. The vehicle wheels 11—11 are provided with inflated pneumatic tires 119 having the usual ground engaging treads. The vehicle trailer frame has the general form of the letter T and comprises a transverse tubular member 14 which has anchored in its ends, short axles 15 which carry the vehicle wheels 11. A longitudinal tubular member 16 has its rear edge 17 in abutment with the central exterior portion of the transverse member 14 where it is secured thereto by a continuous weld. Diagonal braces 18 have their ends welded to the longitudinal and transverse tubular members to form a rigid frame structure.

A load transfer roller 19 is transversely mounted on the frame for longitudinal movement thereon, and, as clearly indicated in Figs. 3-6, each side of the transverse member 14 passes through a pair of spaced plates 20 and 21 that are fixed thereto by welding, or the like. The front ends of a pair of spaced guide members 22—23 are positioned between the plates and are disposed on the upper and lower sides of the member 14, said guide members being secured to the plates by welding, or the like. The ends of the guide members are interconnected by a vertical bar 24 which is welded at its ends to the adjacent edges of the guide members.

The spaced guide members 22—23, the plates 20 and 21, and the vertical bar 24 extend rearwardly from each side of the transverse frame member 14 and form transversely aligned closed guides 25—25. Each of the guides 25—25 has supported therein for longitudinally directed sliding movement a bearing block 26—26. As illustrated in Figs. 5 and 6 these bearing blocks each have longitudinal grooves 27 and 28 formed in their upper and lower edges which respectively receive the adjacent edges of the guide members 22 and 23.

A cross shaft 29 is journaled intermediate its ends in the bearing blocks 26—26 and, as illustrated in Figs. 5 and 6, said shaft passes through the blocks and is journaled in each block by suitable bearings 30. The roller 19 is coaxially mounted on the shaft and is fixed against rotation thereon by suitable keys 31, whilst the outer free ends of the shaft have keyed thereto, as at 32, a pair of friction drive rollers 33—33 which, as illustrated in Fig. 4, are positioned in longitudinal alignment with the vehicle wheels 11—11. It will therefore be noted that the load transfer roller 19 and the friction drive rollers 33—33 are fixed against rotation on the shaft 29 which in turn is journaled in a laterally spaced pair of longitudinally movable bearing blocks 26—26 slidably mounted on the vehicle frame for longitudinal movement between the rear portion thereof and the wheels 11—11. One or more laterally disposed pairs of load supporting rollers may be carried by the frame and as illustrated in Figs. 3 and 4 a roller mounting shaft 34 is fixed in a transverse slot 35 formed in the upper portion of the longitudinal member 16, said shaft being fixed therein as by welding, or the like. Rollers 36—36 are rotatably mounted on the shaft and are held thereon against axial movement by suitable ring members 37 fixed to the shaft. A bulk head 38 is welded at its lower end to the forward end of the longitudinal frame member 16 and may have a diagonal brace 39 welded to its upper forward edge and to the upper sides of said frame member.

During certain directional movements of the trailer for loading and unloading purposes the friction drive rollers 33—33 for the load transfer roller 19 are engaged under correct pressure with the peripheries of the tires carried by the rear wheels 11—11 for the trailer. This function is brought about by means of a link connection between the transfer roller and a draft bar 40 for the trailer. The draft bar extends through and is freely mounted for axial movement in the longitudinal frame member 16. The draft bar has a plate 41 fixed to its rear portion 42 to which is pivoted the inner ends of levers 43—43 that are mounted for rocking movement on arms 44—44 in turn welded to the frame. The outer reduced ends 45—45 of the levers pass through elongated slots 46—46 (Fig. 5) formed through the forward portions of the bearing blocks 26—26. The forward end of the draft bar is welded to a hitch plate 47 which has a hole therein for receiving a pin 48 carried by the bar 12 for the prime mover.

It will be understood that upon the institution of rearward, directional movement of the frame by the prime mover the draft bar will be forced rearwardly of the frame which through the lever connections brings the friction drive rollers 33—33 into operative, positive contact with wheels 11—11 whilst forward movement of the prime mover forces the draft bar in a forward direction thereby moving the friction drive rollers into inoperative positions with their peripheries spaced away from the wheels 11—11.

I also provide means for maintaining the transfer roller and its associated friction drive rollers in their operative or inoperative positions which as most clearly illustrated in Fig. 3 comprises an L-shaped lever 49 pivoted at 50 between spaced arms 51 and 52 riveted at their inner ends to an inverted U-shaped standard 53 which in turn is welded at its lower ends to the forward end of the longitudinal frame member 16. The rear portion 54 of the lever is reduced and freely passes through a slot 55 formed through a cylindrical dog 56, which is guided for vertical movement in aligned apertures formed through the U-shaped standard 53 and the frame member 16. A compression spring 57 encircling the dog and disposed between the standard and the reduced portion 54 urges the lower end of said dog against the draft bar 40. A pair of spaced shoulders 58 and 59 are formed on the draft bar and cooperate with the dog 56 to lock the bar in positions which determine the operative and inoperative positions of the load transfer roller 19, vis., when the dog is positioned between the shoulders 58 and 59 the transfer roller 19 is in operative position with its friction drive rollers 33—33 engaged with the tires of the vehicle wheels 11—11 under a predetermined and constant driving pressure, and when the dog is dropped in back of the shoulder 59, as shown in Fig. 3, the draft bar is in inoperative position to lock the friction rollers 33—33 out of engagement with the tires of said vehicle wheels 11—11. Plate 41 acts against frame member 14 as a stop for the draft bar 40 when the prime mover is actuated to move the vehicle in a forward direction.

During transit of the load on my vehicle it is necessary to lock the transfer roller against rotation to prevent displacement of the load and to this end I preferably employ a toothed ratchet wheel 60, fixed to one side of the shaft 29 between the friction drive roller 33 and the bearing block 26. A pawl 61 cooperates with the ratchet teeth to prevent rotation of the transfer roller in an unloading direction (clockwise as illustrated in Fig. 5). The pawl is pivotally mounted on an extension 63 of the member 22, and is disengaged from the ratchet by a flexible cable 64 remotely controlled by the operator of the prime mover through a manual pull ring 65 mounted on the trailer brace 39 for the bulk head 38.

My invention finds its principal utility in lumber yards where lumber is unloaded from railroad cars, sorted into stacks, and the stacks moved to assigned places in the yards where they stand, subject to order until they are shipped to the fabrication point. These operations are predominantly carried out by hand as the lumber is manually unloaded from the cars and sorted into stacks generally supported on suitable skids which maintain them in spaced relation from the ground. The skid is picked up and moved to its assigned place in the lumber yard by a fork truck or tractor which has a raising mechanism thereon adapted to engage under the skid. The lumber is manually loaded from the skid upon the usual motor truck and transported to its fabricating destination thereon.

My device practically eliminates the handling of lumber in the yards, it being only necessary to sort it from the railroad cars into inclined stacks 66 (Fig. 1) each of which is supported by a suitable propping member 67 at an intermediate point along its length and which has one lower edge resting upon the ground. The stack is preferably bound together in packages by steel strapping 68, or the like.

With particular reference to Fig. 1 my heavy duty vehicle is automatically loaded by providing it with the directional movement indicated by the arrow through the prime mover or tractor 13 until the load transfer roller 19 engages the underside of the stack 66. The lever 48 is then pulled forwardly by the tractor operator to release the dog 56 from in back of the shoulder 59 on the draft bar 40, so that it will be conditioned by spring 57 to fall between the shoulders 58 and 59 upon initial movement of the vehicle against the inertia of the stack, for the draft bar will move rearwardly, and through its lever connections 43—43, the friction drive rollers 33—33 will be urged into contact with the peripheries of the tires on the rear wheels 11—11. When a predetermined pressure occurs between the tires and the friction drive rollers the dog 55 will be moved between the fixed shoulders 58 and 59 on the draft bar 40 thereby locking the bar against longitudinal axial movement and maintaining the friction rollers in correct pressure contact with the wheels. Contact of the friction drive rollers 33—33 with wheels 11—11 positively rotates transfer roller 19 at a speed and direction equal to the ground speed of the vehicle and as the vehicle continues to be driven rearwardly the front end of the stack 66 is raised, the prop 67 falls, and the transfer roller raises the load 66 upon the frame to a position illustrated in Fig. 2. The vehicle may then be driven forward in the direction of the arrow (Fig. 2) at which time the lever 49 is again released to permit the draft bar to be moved forwardly thereby moving the roller 19 rearwardly to disengage the friction drive rollers 33—33 from wheels 11—11 where the dog 56 will drop behind the shoulder 59 and hold the roller in the position indicated in Fig. 3. In said inoperative position the pawl 61 engages the teeth of the ratchet 60 to preclude rotation of the transfer roller.

An important factor in the satisfactory operation of my heavy duty vehicle is the positive control of the driving pressure between the pneumatic tires 110 and the friction rollers 33 by the draft bar locking means. If the pressure is not great enough slippage occurs between the vehicle wheels 11—11 and the friction drive rollers 33—33 thereby rendering the transfer roller 19 ineffective for loading and unloading purposes and, on the other hand, if the driving pressure between the tires and the friction rollers is too great the rollers are forced into the treads of the tires and act as brake shoes on the vehicle wheels thereby particularly precluding the loading of my vehicle. In general the periphery of a pneumatic tire is depressed under load to about one inch and a half along its out of round road contacting surface and it is contemplated that my friction drive roller be locked by the draft bar in a driving position which will depress or sink it into the tread or tire periphery to about the same depth measurement. For efficient operation the tires of my vehicle should always be maintained at their proper pressures.

I have also found that there are certain limitations as to height and length of the inclined load which may be handled by my automatic loading device. In the first place the load transfer roller should be positioned on the trailer as close to the ground as is practically possible, secondly, the length of the load varies directly with its height, and thirdly the loading speed of the vehicle should be greater for relatively short and high loads and slower for longer and lower loads.

To unload my device the dog is first released from behind the shoulder 59 by operation of lever 49 and the vehicle moved by the prime mover in a rearward direction until the friction drive rollers 33—33 contact the wheels 11—11 where they are held by releasing the lever 49 to permit the dog 56 to fall between the shoulders 58 and 59. Upon release of the ratchet by pulling the ring 65 the vehicle may be moved in a forwardly direction and the transfer roller will be driven in a direction of and at a speed equal to ground speed to move the lumber to the position illustrated in Fig. 1 where a prop 67 may be inserted thereunder provided the lumber is to be picked up again by my device and thereafter the vehicle is moved away from under the stack. If the stack is not to be picked up again the vehicle may deposit the stack directly upon the ground, if desired.

What is claimed is:

1. A loading device for a vehicle having a body and at least a pair of rear ground engaging wheels supporting the body, said device comprising a transverse shaft journaled in one end of said body for longitudinal shifting movement thereon, and having its ends extending beyond the sides of the body, a load transfer roller fixed to the central part of the shaft, and a ground wheel engaging friction drive roller fixed to each of the shaft ends, said friction drive rollers being normally held by the shaft in proximate, spaced relationship relative to the wheels, and means operative, upon movement of the vehicle body in one direction, for shifting the shaft to thereby engage the friction rollers and the wheels.

2. In a vehicle the combination of a frame having spaced side members supported at least by a pair of rear wheels, longitudinal guides formed in the frame members and disposed in transverse alignment between the rear wheels and the rear frame end, a load transfer roller mounted for longitudinal movement in the guides, friction rollers fixed coaxially to the roller and in longitudinal alignment with the wheels, and means on the frame for engaging and disengaging the friction rollers and the wheels.

3. In a heavy duty vehicle for picking up an inclined load the combination of a frame having at least a pair of rear wheels, a prime mover for the frame, a load transfer roller disposed transversely of the frame and between the rear frame end and the wheels, means for mounting said roller on the frame for alternating motion longitudinally of the frame, friction rollers fixed to the transfer roller and having their peripheries in longitudinal alignment with the vehicle wheels whereby upon rearwardly directed movement of the frame the load transfer roller is engaged under the inclined load, and forces the friction rollers into positive driving contact with the vehicle wheels.

4. In a heavy duty vehicle for picking up an inclined load comprising a wheeled frame, a transverse load moving roller mounted for alternate, longitudinal movement intermediate the rear wheels and the frame end, friction drive rollers fixed to the load moving roller and positioned in longitudinal alignment with the rear wheels whereby upon rearwardly directed movement of the frame the load moving roller is positively driven by engagement of the friction rollers and the wheels.

5. In a heavy duty vehicle the combination of a frame having at least a pair of rear ground wheels, a transverse, load transfer roller freely mounted on the frame for alternate, longitudinal movement between the wheels and the rear frame end, friction drive rollers fixed to the load transfer roller and positioned in longitudinal alignment with said rear wheels, a longitudinal draft bar mounted on the frame for axial movement, a prime mover independent of the frame, means for hitching the forward end of the bar to the mover, and power transmitting means between the bar and the load transfer roller for engaging and disengaging the friction drive rollers and the rear wheels upon alternate directional movement of the vehicle by the prime mover.

6. In a heavy duty vehicle the combination of a frame having spaced side members supported at least by a pair of rear wheels, longitudinal guides formed in the frame members and disposed in transverse alignment between the rear wheels and the rear frame end, a guide block mounted in each guide, a load transfer roller journaled in the blocks, friction rollers fixed coaxially to the transfer roller and disposed in longitudinal alignment with the wheels, a longitudinal draft bar mounted on the frame for axial movement, link connections between the bar and the guide blocks, a prime mover independent of the frame, and means for hitching the prime mover to the forward end of the draft bar.

7. In a heavy duty vehicle the combination of a frame having spaced side members supported at least by a pair of rear wheels, longitudinal guides formed in the frame members and disposed in transverse alignment between the rear wheels and the rear frame end, a guide block mounted in each guide, a load transfer roller journaled in the blocks, friction rollers fixed coaxially to the transfer roller and disposed in longitudinal alignment with the wheels, a two position draft bar mounted for axial movement longitudinally of the frame, a link connection between the bar and the guide blocks, a reversing prime mover independent of the frame, means for hitching the prime mover to the forward end of the draft bar, and a releasable lock means between the frame and the bar for selectively securing the bar in either of its two positions.

8. In a heavy duty vehicle the combination of a frame having spaced side members supported at least by a pair of rear wheels, longitudinal guides formed through the frame members and disposed in transverse alignment between the wheels and the rear frame end, a guide block slidably mounted in each guide, a load transfer roller journaled in the blocks, said roller being freely movable on the frame between a forward operative position and a rearward inoperative position, a friction drive roller fixed coaxially to each side of the transfer roller, said rollers being disposed in longitudinal alignment with the wheels and adapted to have their peripheries in driving engagement with the wheels when the transfer roller is in its operative position, and to have said peripheries disengaged from the wheels when the transfer roller is in inoperative position, a two position draft bar mounted for axial movement longitudinally of the frame, link connections between the bar and the blocks, a reversing prime mover independent of the frame, and means for hitching the forward end of the bar to the prime mover whereby upon rearward directional movement of the vehicle the transfer roller is moved to its operative position and upon forward movement of the vehicle the transfer roller is moved to its inoperative position.

9. In a heavy duty vehicle the combination of a frame having spaced side members supported at least by a pair of rear wheels, longitudinal guides formed through the frame members and disposed in transverse alignment between the wheels and the rear frame end, a guide block slidably mounted in each guide, a load transfer roller journaled in the blocks, said roller being freely movable on the frame between a forward operative position and a rearward inoperative position, a friction drive roller fixed coaxially to each side of the transfer roller, said rollers being disposed in longitudinal alignment with the wheels and adapted to have their peripheries in driving engagement with the wheels when the transfer roller is in its operative position, and to have said peripheries disengaged from the wheels when the transfer roller is in inoperative position, a two position draft bar mounted for axial movement longitudinally of the frame, manually operable means for locking said bar in either of its said positions, link connections between the bar and the blocks, a reversing prime mover independent of the frame, and means for hitching the forward end of the bar to the prime mover whereby upon rearward directional movement of the vehicle the transfer roller is moved to its operative position and upon forward movement of the vehicle the transfer roller is moved to its inoperative position.

10. In a heavy duty vehicle for picking up an inclined load the combination of a frame having at least a pair of rear wheels, pneumatic tires for said wheels, a prime mover for the frame, a load transfer roller disposed transversely of the frame and between the rear frame end and the wheels, means for mounting said roller on the frame for alternating motion longitudinally of the frame, friction rollers fixed to the transfer roller and having their peripheries in longitudinal alignment with the vehicle wheels whereby upon rearwardly directed movement of the frame the load transfer roller is engaged under the inclined load, and forces the friction rollers into positive driving contact with the vehicle wheels, and means on the frame for locking the wheels and friction roller in said positive driving contact.

PHILIP DE ANGUERA.

REFERENCES CITED

The following references are of record in the file of this patent:

UNITED STATES PATENTS

| Number | Name | Date |
| --- | --- | --- |
| 1,142,672 | Clayton | June 8, 1915 |
| 2,156,438 | Suverkrup | May 2, 1939 |
| 2,044,652 | Walker | June 16, 1936 |
| 2,377,786 | Johnson et al. | June 5, 1945 |
| 2,407,930 | La Pointe | Sept. 17, 1946 |
| 2,407,993 | McKee | Sept. 24, 1946 |